United States Patent [19]

Linder et al.

[11] 4,377,086
[45] Mar. 22, 1983

[54] SENSOR SYSTEM

[75] Inventors: Ernst Linder, Mühlacker; Klaus Müller, Tamm; Helmut Maurer, Horrheim, all of Fed. Rep. of Germany

[73] Assignee: Robert Bosch GmbH, Stuttgart, Fed. Rep. of Germany

[21] Appl. No.: 214,720

[22] Filed: Dec. 9, 1980

[30] Foreign Application Priority Data

Mar. 26, 1980 [DE] Fed. Rep. of Germany ....... 3011569

[51] Int. Cl.³ ............................................ G01L 23/22
[52] U.S. Cl. ...................... 73/35; 250/227; 350/96.1
[58] Field of Search ................ 250/227, 554; 73/35; 350/96.10, 96.24, 61; 356/44, 241, 315, 417

[56] References Cited

U.S. PATENT DOCUMENTS

| 3,067,610 | 12/1962 | Bockemuehl et al. | 73/35 X |
| 3,088,037 | 4/1963 | Baum | 250/227 |
| 3,153,172 | 10/1964 | Ling | 250/227 X |
| 4,064,308 | 12/1977 | Laurin | 350/61 X |

Primary Examiner—James J. Gill
Attorney, Agent, or Firm—Frishauf, Holtz, Goodman & Woodward

[57] ABSTRACT

For detecting oscillations occurring during knocking detonations in an internal combustion engine, optical detectors are located in the combustion chamber. In order to minimize the contamination of the window of the sensor system on the side of the combustion chamber, the surface of the window is provided with contours defining points and/or edges. In order to receive the largest amount of light, the window is so formed as to bulge into the combustion chamber and may be coated with a contamination-resistant layer.

4 Claims, 7 Drawing Figures

SENSOR SYSTEM

The invention relates to a knock detector sensor system for use with internal combustion engines.

BACKGROUND

In patent application, assigned to the assignee of this application, Ser. No. 214,481, Dec. 9, 1980, Muller et al. (to which German application No. P 30 01 711.9 corresponds), there is proposed a sensor system for detecting the oscillations that occur during detonations of an internal combustion engine, using at least one optical sensor, preferably a glass rod or a light-conducting cable made of glass fibers. The optical sensors are then integrated with the spark plug, attached to a pre-chamber or inserted into the cylinder head gasket.

THE INVENTION

It is an object to reduce contamination by dirt and the like of the optical sensor exposed to combustion gases in the combustion chamber.

Briefly, the sensor is formed with a window coupled to a light guide, and the window, in accordance with the invention, has a surface which has the characteristics that it forms points or edges; the window, preferably, bulges into the combustion chamber and may be supplied with a dirt-resistant coating, for example a vapor deposit of silver.

The sensor system according to the invention has the advantage of achieving reduced contamination of the combustion chamber window of the sensor system even for extended periods of operation.

Improvement of the light yield is achieved by forming the window in convex form, extending into the combustion chamber. Deposits of contamination on the window may be still further reduced by vapor-depositing a contaminant-resistant layer on the window, preferably silver.

DRAWINGS

DESCRIPTION OF THE EXEMPLARY EMBODIMENTS

Figure 1:
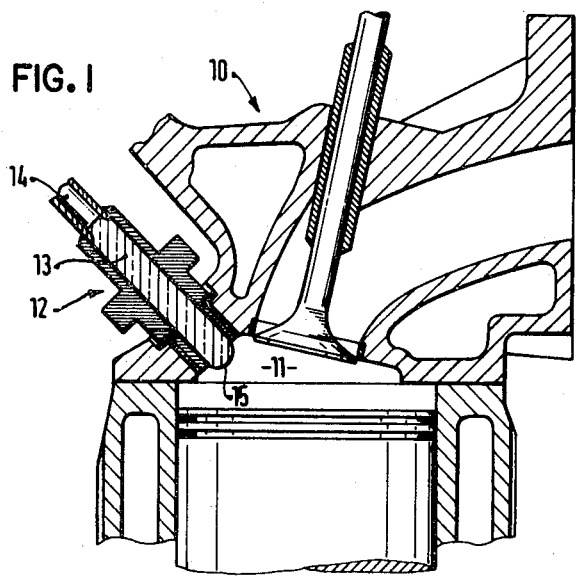
FIG. 1 shows the disposition of a sensor system according to the invention in a cylinder head.

In FIG. 1, the reference number 10 designates a cylinder head cover that closes the top of a combustion chamber 11. A sensor system 12, acting as an optical detector, is threadedly secured in the cylinder head cover 10.

For the purpose of optical detection, the sensor system 12 is provided with an axially disposed glass rod 13 which is coupled to a light conductor 14 at its end remote from the combustion chamber. The light conductor 14 leads to a light-sensitive element not shown in FIG. 1, for example a photo diode, a photo transistor or a photo resistor. Disposed at the end of the glass rod 13 adjacent the combustion chamber is the window 15 which is formed by a convex shaping of the glass rod 13 in the example shown. According to the invention, the window 15 is formed with points and edges as shown in exemplary manner in FIGS. 2-4. In the window 15a according to FIG. 2, annular and radial ground slots define a surface on which are formed many edges 16. In the embodiment of the window 15b according to FIG. 3, a surface is formed having a plurality of points 17, in the manner of a "cat's eye". The window 15c of FIG. 4 is flat, in contrast to the convex windows 15a, 15b, it has ground slots disposed at definite angles resulting in points 18.

Figures 2A, 2B:
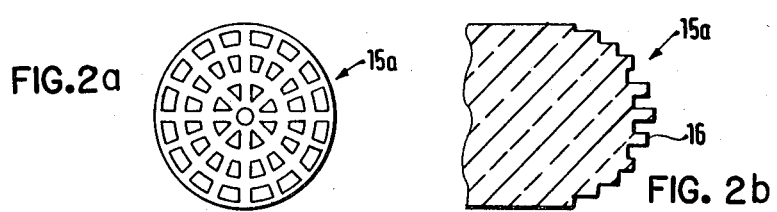
FIGS 2a, 3a, 4a, show flattened end views of different embodiments of the combustion chamber window of the sensor system.
FIGS. 2b, 3b, 4b show diametrical cross sections of FIGS. 2a, 3a, 4a, respectively.
Figures 3A, 3B:
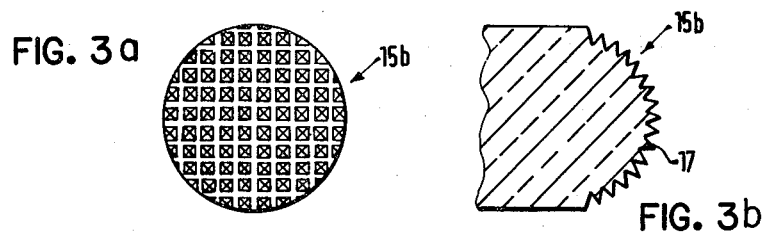
Figures 4A, 4B:
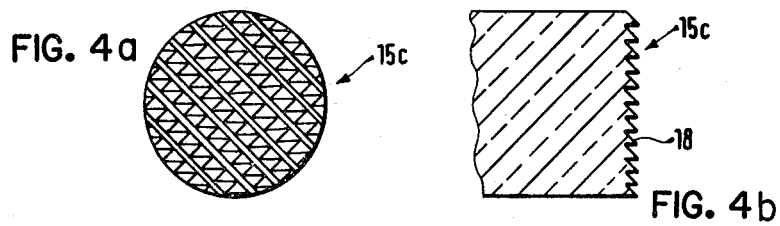

The windows 15a and 15b according to FIGS. 2 and 3 respectively, generate a wider field of view into the combustion chamber; the window 15c according to FIG. 4 is flush with the combustion chamber wall. The edges and points formed on the windows 15a, 15b and 15c are scrubbed clean by the combustion gases that pass them at great velocity. The self-cleaning effect, which, for the windows 15a, 15b according to FIGS. 2 and 3, respectively, is further enhanced by their convex shape, makes possible the detection of an optical signal in the combustion chamber even for extended periods of operation of the sensor system.

We claim:

1. In and for combination with an internal combustion engine, a sensor system for detecting oscillations occurring during knocking detonations in a cylinder of the internal combustion engine and employing at least one optical detector optically exposed to the combustion chamber having a light guide window facing the combustion chamber, wherein
    the surface of the window (15, 15a, 15b, 15c) disposed on the side facing the combustion chamber comprises means for enhancing the clean-scrubbing action of combustion gases passing the window at high velocity including at least one of: points (17, 18); edges (16) formed on said surface of the window.

2. A sensor system according to claim 1, wherein the window (15, 15a, 15b, 15c) bulges into the combustion chamber (11).

3. A sensor system according to claim 2, wherein a vapor deposit of a contaminant-resistant layer is applied to the window surface.

4. A sensor system according to claim 3, wherein the layer is silver.